US012144780B2

(12) United States Patent
Blaine et al.

(10) Patent No.: US 12,144,780 B2
(45) Date of Patent: *Nov. 19, 2024

(54) SYSTEM AND METHOD FOR DYNAMIC DEVICE DISCOVERY AND ADDRESS ASSIGNMENT

(71) Applicant: Hayward Industries, Inc., Berkeley Heights, NJ (US)

(72) Inventors: David M. Blaine, North Kingston, RI (US); Kenneth W. White, Jr., East Dennis, MA (US); Craig Andrew Horrocks, North Kingstown, RI (US); James Murdock, Wakefield, RI (US); Douglas M. Sawyer, Jr., Seekonk, MA (US); Carl Brunetti, Manville, RI (US); Robert Donald Heon, Warwick, RI (US); Linnette Rivera, Tyngsborough, MA (US)

(73) Assignee: Hayward Industries, Inc., Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/196,970

(22) Filed: May 12, 2023

(65) Prior Publication Data

US 2023/0277413 A1 Sep. 7, 2023

Related U.S. Application Data

(63) Continuation of application No. 18/096,957, filed on Jan. 13, 2023, now Pat. No. 11,723,836, which is a
(Continued)

(51) Int. Cl.
A61H 33/00 (2006.01)
G05B 15/02 (2006.01)
(Continued)

(52) U.S. Cl.
CPC .......... *A61H 33/005* (2013.01); *G05B 15/02* (2013.01); *G05B 19/0423* (2013.01);
(Continued)

(58) Field of Classification Search
CPC ............... G05B 15/02; G05B 19/0423; G05B 2219/21081; G05B 2219/25096;
(Continued)

(56) References Cited

U.S. PATENT DOCUMENTS 7,155,497 B2 * 12/2006 Grover ............... H04L 61/5092
709/228
7,356,011 B1 4/2008 Waters et al.
(Continued)

OTHER PUBLICATIONS

International Search Report and Written Opinion of the International Searching Authority mailed on Jul. 29, 2014, issued in connection with International Application No. PCT/US2014/028858 (8 pages).
(Continued)

Primary Examiner — Rachel J Hackenberg
(74) Attorney, Agent, or Firm — McCarter & English, LLP

(57) ABSTRACT

A pool or spa system includes networked pool or spa devices that can be dynamically configured with network addresses by a controller. The controller can transmit a device discovery request on a network and can receive a discovery response from pool or spa devices that require a network address. The system determines and assigns the network addresses for the pool or spa devices based on unique device identifiers associated with the responding pool or spa devices. The network addresses assigned to the pool or spa device are transmitted to the pool or spa device to be used by the pool or spa devices to communicate with the controller over the network. The system can be used to discover and assign addresses to various types of pool or spa devices,
(Continued)

such as pumps, underwater lights, chlorinators, water feature controllers, remote controllers, and/or other types of devices.

25 Claims, 7 Drawing Sheets

Related U.S. Application Data continuation of application No. 17/898,228, filed on Aug. 29, 2022, now Pat. No. 11,554,077, which is a continuation of application No. 14/213,172, filed on Mar. 14, 2014, now Pat. No. 11,426,325.

(60) Provisional application No. 61/787,809, filed on Mar. 15, 2013.

(51) Int. Cl.
| | | |
|---|---|---|
| *G05B 19/042* | (2006.01) | |
| *H04L 12/28* | (2006.01) | |
| *H04L 41/046* | (2022.01) | |
| *H04L 61/103* | (2022.01) | |
| *H04L 61/5038* | (2022.01) | |
| *H04L 67/10* | (2022.01) | |

(52) U.S. Cl.
CPC ........ *H04L 12/2809* (2013.01); *H04L 41/046* (2013.01); *H04L 61/5038* (2022.05); *H04L 67/10* (2013.01); *A61H 2033/0083* (2013.01); *A61H 33/0095* (2013.01); *A61H 2201/5007* (2013.01); *A61H 2201/501* (2013.01); *A61H 2201/5012* (2013.01); *A61H 2201/5015* (2013.01); *A61H 2201/5043* (2013.01); *A61H 2201/5097* (2013.01); *G05B 2219/21081* (2013.01); *G05B 2219/25096* (2013.01); *H04L 2012/285* (2013.01); *H04L 61/103* (2013.01)

(58) Field of Classification Search
CPC .............. A61H 33/005; A61H 33/0095; A61H 2033/0083; A61H 2201/5007; A61H 2201/501; A61H 2201/5012; A61H 2201/5015; A61H 2201/5043; A61H 2201/5097; H04L 12/2809; H04L 41/046; H04L 61/5038; H04L 61/103; H04L 2012/285
See application file for complete search history.

(56) References Cited

U.S. PATENT DOCUMENTS

| | | | |
|---|---|---|---|
| 8,923,749 B2 | 12/2014 | Igoe | |
| 9,538,355 B2 | 1/2017 | Zhang et al. | |
| 11,426,325 B2* | 8/2022 | Blaine .................. | A61H 33/005 |
| 11,554,077 B1* | 1/2023 | Blaine .................. | H04L 12/2809 |
| 11,723,836 B2* | 8/2023 | Blaine .................. | A61H 33/005 |
| | | | 700/275 |
| 2004/0221067 A1 | 11/2004 | Huang et al. | |
| 2005/0033826 A1 | 2/2005 | Jones et al. | |
| 2007/0093920 A1 | 4/2007 | Tarpo et al. | |
| 2007/0294443 A1 | 12/2007 | Berenbaum et al. | |
| 2008/0304408 A1 | 12/2008 | Kraemer et al. | |
| 2010/0145479 A1* | 6/2010 | Griffiths .................. | H04L 67/12 |
| | | | 700/17 |
| 2010/0299401 A1 | 11/2010 | Lloyd | |
| 2010/0299430 A1* | 11/2010 | Powers ............... | H04L 63/1416 |
| | | | 709/224 |
| 2011/0002261 A1 | 1/2011 | Mocanu et al. | |
| 2011/0196990 A1 | 8/2011 | Govindaraju et al. | |
| 2011/0286859 A1 | 11/2011 | Ortiz et al. | |
| 2012/0093508 A1 | 4/2012 | Baykal et al. | |
| 2012/0151159 A1* | 6/2012 | Muralimanohar ..... | A01N 65/08 |
| | | | 711/E12.001 |
| 2012/0185571 A1 | 7/2012 | Uy | |
| 2012/0221746 A1 | 8/2012 | Grinberg | |
| 2012/0239206 A1 | 9/2012 | Sauer et al. | |
| 2012/0265860 A1 | 10/2012 | Bockus et al. | |
| 2013/0027176 A1 | 1/2013 | Stocker | |
| 2013/0124763 A1 | 5/2013 | Kessler | |
| 2013/0188514 A1 | 7/2013 | Jain | |
| 2013/0211546 A1 | 8/2013 | Lawson et al. | |
| 2013/0212574 A1 | 8/2013 | Hutchinson et al. | |
| 2014/0064139 A1 | 3/2014 | Mcqueen et al. | |
| 2014/0336821 A1 | 11/2014 | Blaine et al. | |
| 2017/0346688 A1 | 11/2017 | Reddy et al. | |
| 2022/0409481 A1 | 12/2022 | Blaine et al. | |

OTHER PUBLICATIONS

Office Action dated May 20, 2016, issued in connection with U.S. Appl. No. 14/213,172 (26 pages).
Extended European Search Report dated Oct. 4, 2016, issued in connection with European Patent Application No. 14765575.7 (8 pages).
Office Action dated Feb. 21, 2017, issued in connection with U.S. Appl. No. 14/213,172 (31 pages).
Office Action dated Nov. 13, 2017, issued in connection with U.S. Appl. No. 14/213,172 (34 pages).
Office Action dated Jun. 25, 2018, issued in connection with U.S. Appl. No. 14/213,172 (35 pages).
Australian Examination Report dated Jan. 18, 2019, issued in connection with Australian Patent Application No. 2014229102 (6 pages).
European Examination Report dated Mar. 4, 2019, issued in connection with European Patent Application No. 14765575.7 (7 pages).
European Examination Report dated Sep. 12, 2019, issued in connection with European Patent Application No. 14765575.7 (7 pages).
Australian Examination Report dated Sep. 23, 2019, issued in connection with Australian Patent Application No. 2014229102 (4 pages).
Australian Examination Report dated Jan. 7, 2020, issued in connection with Australian Patent Application No. 2014229102 (7 pages).
Canadian Office Action dated Apr. 24, 2020, issued in connection with Canadian Patent Application No. 2,906,071 (4 pages).
Communication under Rule 71(3) EPC (Intention to Grant) dated Sep. 9, 2020, issued in connection with European Patent Application No. 14765575.7 (5 pages).
Canadian Office Action dated May 13, 2021, issued in connection with Canadian Patent Application No. 2,906,071 (4 pages).
Office Action dated May 24, 2021, issued in connection with U.S. Appl. No. 14/213,172 (8 pages).
Extended European Search Report dated Sep. 7, 2021, issued in connection with European Patent Application No. 21172073.5 (9 pages).
Office Action dated Sep. 20, 2021, issued in connection with U.S. Appl. No. 14/213,172 (11 pages).
Examiner Interview Summary Record mailed on Mar. 25, 2022, in connection with U.S. Application No. 14/213,172 (4 pages).
Notice of Allowance and Examiner Interview Summary Record mailed on Apr. 18, 2022, in connection with U.S. Appl. No. 14/213,172 (20 pages).
Notice of Allowance and Examiner Interview Summary Record mailed on Nov. 21, 2022, in connection with U.S. Appl. No. 17/898,228 (12 pages).
Notice of Allowance and Examiner Interview Summary Record mailed on Apr. 19, 2023, in connection with U.S. Appl. No. 18/096,957 (12 pages).
Examination Report dated May 9, 2023, issued in connection with European Patent Application No. 21172073.5 (3 pages).

(56) References Cited

OTHER PUBLICATIONS

Canadian Office Action dated Jan. 4, 2024, issued in connection with Canadian Patent Application No. 2,906,071 (4 pages).

\* cited by examiner

| Discovery Commands ||| 
|---|---|---|
| Command / Response | Value | Data |
| AUR Cmd | 0x01 | Time Out Value |
| AUR Resp | 0x11 | UA of Responding Device |
| AUF Cmd | 0x02 | Family Byte + Time Out Value |
| AUF Resp | 0x12 | UA of Responding Device |
| AHNA Cmd | 0x03 | UA of Target Device NA Assigned to Target Device |
| AHNA Resp | 0x13 | TLV Capabilities |

SYSTEM AND METHOD FOR DYNAMIC DEVICE DISCOVERY AND ADDRESS ASSIGNMENT

CROSS REFERENCE TO RELATED APPLICATIONS

The present application is a continuation of U.S. application Ser. No. 18/096,957 filed on Jan. 13, 2023, which is a continuation of U.S. application Ser. No. 17/898,228 filed on Aug. 29, 2022 (U.S. Pat. No. 11,554,077), which is a continuation of U.S. application Ser. No. 14/213,172 filed on Mar. 14, 2014 (U.S. Pat. No. 11,426,325), which claims benefit of priority to U.S. Provisional Application No. 61/787,809 filed on Mar. 15, 2013, the entire disclosures of which are all expressly incorporated by reference herein.

FIELD OF THE INVENTION

The present invention relates to device discovery and address assignment for various devices on a network. More particularly, the present invention relates to a system and method for dynamic device discovery and address assignment for pool/spa equipment interconnected via a network.

BACKGROUND OF THE INVENTION

Typically, discovery of devices on a half-duplex serial bus is accomplished by incrementing through a pre-defined address range, sending a response request to devices that are connected to a network, and recording the devices that respond. The Modbus communications protocol is one example of this approach.

In Modbus and other similar incremental addressing schemes, device enrollment can present some problematic conditions. For example, each device must be pre-addressed with a unique address to prevent multiple devices from having an identical address. This requirement makes setup and configuration of a network both a time consuming and error prone process. Therefore, it would be desirable to provide a network device discovery protocol that does not require pre-assignment of device addresses, yet allows any number of like devices to be added to the network.

SUMMARY OF THE INVENTION

The present invention overcomes the disadvantages and shortcomings of the prior art by providing a system and method for dynamic device discovery and address assignment for a network. The system transmits a device discovery request from a master device on a network, such as a pool/spa system controller, and receives a discovery response from a slave device which includes a pre-configured identifier. The system determines a network address based on the slave device identifier, and transmits an enrollment instruction with the network address to be used by the slave device. The system could be used to discover and assign addresses to various types of devices on a pool/spa network, such as pumps, underwater lights, chlorinators, water feature controllers, remote controllers, and/or other types of devices.

A pool or spa system for a pool or spa is disclosed that includes components operatively coupled via a communications network supporting dynamic device discovery. The system can include slave devices and a master controller. Each slave device is configured to perform one or more operations with respect to the pool or spa. Each of the slave devices is initially un-configured and has a unique device identifier associated therewith. The master controller is operatively coupled to the slave devices to form a network. The master controller is programmed to assign each of the slave devices a network address based on the unique identifier of each of the slave devices and in response to bidirectional communication between the master controller and the slave devices to configure the slave devices and enable addressed communication between the controller and the slave devices. The slave devices could include a pump, a filter, a sensor, a heater, or other equipment.

The master controller can broadcast a device discovery request on the network requesting a response from the slave devices and can receive, in response to the device discovery request, a response from a first device of the slave devices including the unique identifier associated with the first device. The master controller can correlate the device identifier received from the first device with an available network address, assign the network address to the first device, and can transmit a message on the network that includes the device identifier and the network address. The first device can receive the message, compare the device identifier in the message to the device identifier of the first device, and store the network address as the network address of the first device based on a determination that the device identifier included in the message matches the device identifier of the first device. At least one slave device can be configured such that it does not retain the network address assigned by the master controller when the slave device is powered down. The master controller can be programmed to periodically determine whether the network includes a slave device requiring configuration and/or can be programmed to maintain at least one table correlating the unique device identifier of each of the slave devices with the network address assigned to each of the slave devices.

The pool or spa system can include a gateway device operatively coupled between at least one of the slave devices and the master controller. The gateway communicates with the master controller on behalf of the at least one of the slave devices to facilitate assignment of the network address to the at least one of the slave devices.

A system for dynamic discovery of networked devices in a pool or spa system is disclosed that includes a non-transitory computer-readable medium and a processing device (or master controller). The non-transitory computer-readable medium stores computer executable instructions for a process of dynamically discovering networked devices in a pool or spa system. The processing device is programmed to execute the computer executable instructions to transmit a broadcast message including a device discovery request to the networked devices in the pool or spa system, receive a response message from an un-configured pool or spa device in the pool or spa system that includes a unique device identifier associated with the un-configured device, correlate the unique device identifier with a network address, and transmit the network address to the un-configured pool or spa device to transform the un-configured pool or spa device to a configured pool or spa device.

Also provided is a method of dynamically discovering networked devices in a pool or spa system. The method includes the steps of transmitting a broadcast message including a device discovery request to the networked devices in the pool or spa system, receiving a response message from an un-configured pool or spa device in the pool or spa system that includes a unique device identifier associated with the un-configured device, correlating the unique device identifier with a network address, and transmitting the network address to the un-configured pool or spa device to transform the un-configured pool or spa device to a configured pool or spa device.

BRIEF DESCRIPTION OF THE DRAWINGS

The foregoing features of the invention will be apparent from the following Detailed Description of the Invention, taken in connection with the accompanying drawings, in which.

DETAILED DESCRIPTION OF THE INVENTION

The present invention relates to a system and method for dynamic device discovery and address assignment for a network, as discussed in detail below in connection with FIGS. 1-15.

Figure 1:
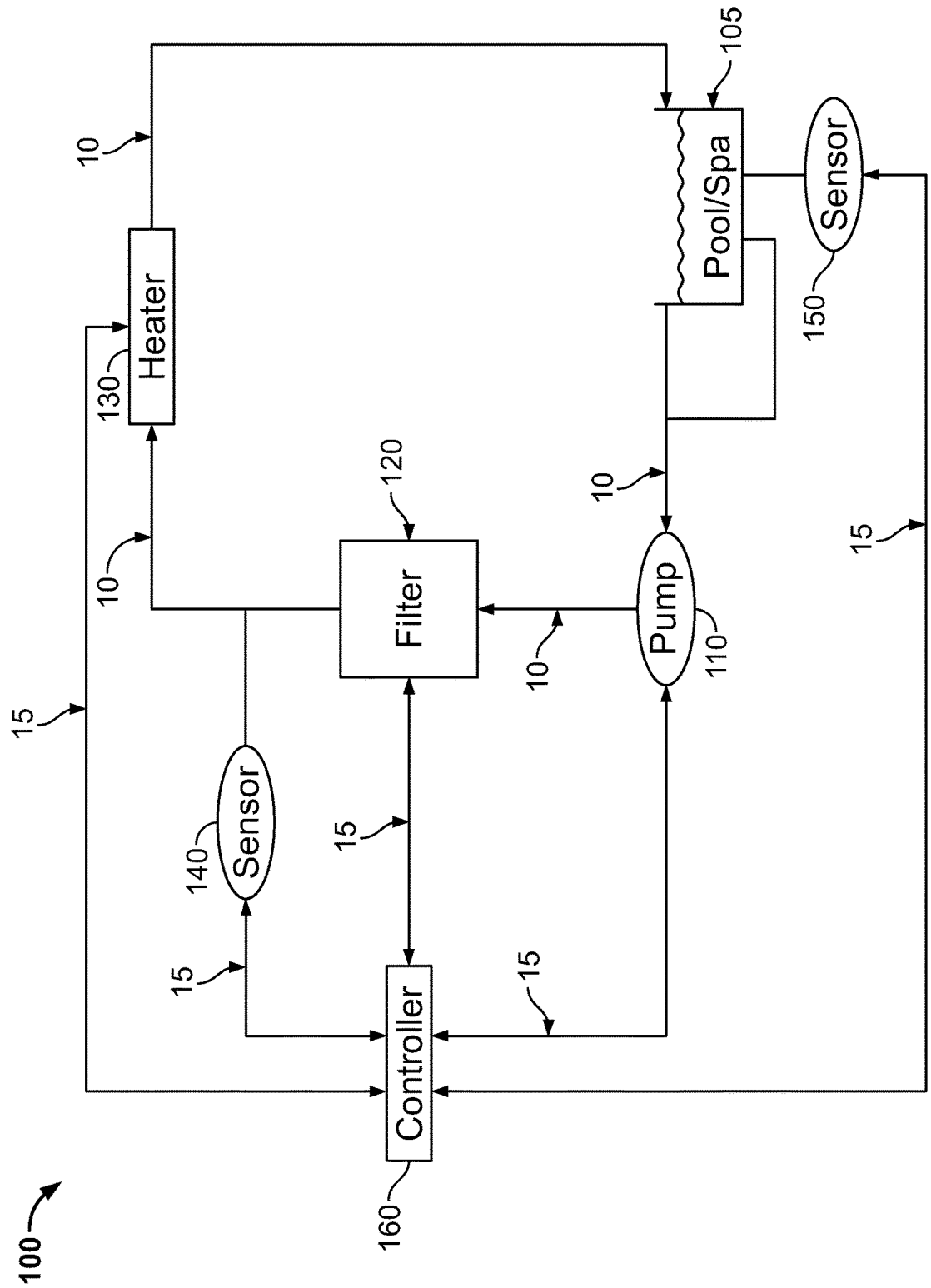
FIG. 1 is a diagram of a pool or spa pump system with a plurality of networked devices connected to a controller.

FIG. 1 is a diagram of a pool or spa system 100 with a plurality of networked pool or spa devices 110-150 connected to a controller 160. The controller 160 could be a central pool/spa system controller, such as the PRO LOGIC line of pool/spa systems controllers manufactured by Hayward Industries, Inc. In a typical pool or spa system 100, pump 110 is fluidly connected via pipes 10 to pool/spa 105. Pump 110 provides a positive water pressure to drive water through filter 120 to remove debris from pool/spa 105. Optionally, heater 130 can be fluidly connected to pump 110 to provide water heating of pool/spa 105 as desired. Sensors 140, 150 are strategically placed along the pool/spa system 100 to provide water measurements, for example, water pressure, temperature, salinity, etc. Sensors 140, 150 report measurements back to controller 160. The system 100 can include other devices commonly utilized in a pool/spa system, such as underwater lights, chlorinators, water feature controllers, remote controllers, and/or other suitable types of pool or spa devices. Controller 160 provides a central control of the pool/spa system 100 to include, for example, timing of pump 110 operation, heater operation for temperature control, etc. As discussed in detail below, the controller 160 and the devices 110, 120, 130 can be operatively coupled (as shown by line 15) to form a network of devices that communicate in accordance with the present invention to facilitate dynamic discovery of devices on the network and to assign addresses thereto. One or more of the devices 110-150 can be operatively coupled to the controller 160 via wires, cables, or buses, and/or can be in wireless communication with each other.

Figure 2:
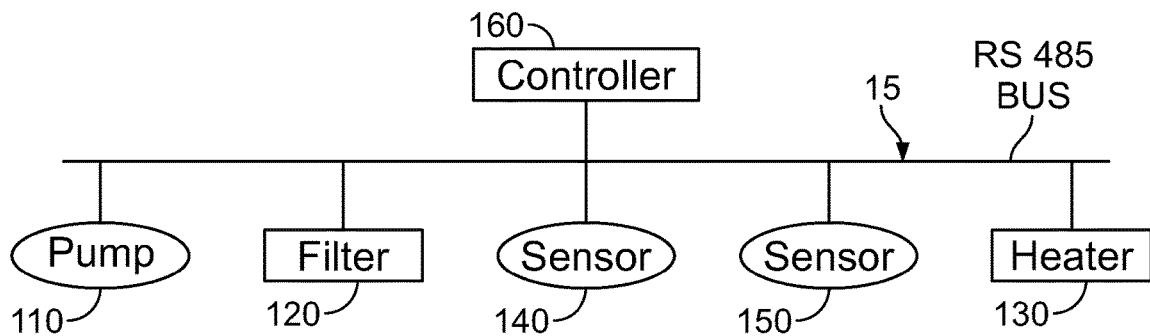
FIG. 2 is a diagram of a network system with a common bus connecting a plurality of network devices to a controller.

FIG. 2 is a diagram of a network system with a common data bus 15 (e.g. RS-485 half-duplex serial bus) connecting the plurality of network devices 110-150 to the controller 160. During installation of pool/spa system 100, networked devices are connected via data bus 15. Controller 160 provides operational control of pool/spa system 100. Instead of pre-coding each device 110-150 with a unique network address, controller 160 (e.g., a master unit) connected to the pool/spa network dynamically discovers devices operatively coupled to bus 15 and assigns each device a unique address at the time of discovery, as described herein. This removes the requirement that all devices 110-150 be pre-addressed, and advantageously allows any number of like devices 110'-150' (not shown) to co-exist with pre-existing devices 110-150. This method greatly reduces setup and configuration time as well as configuration errors by removing the manual process of pre-coding network addresses.

Figure 3:
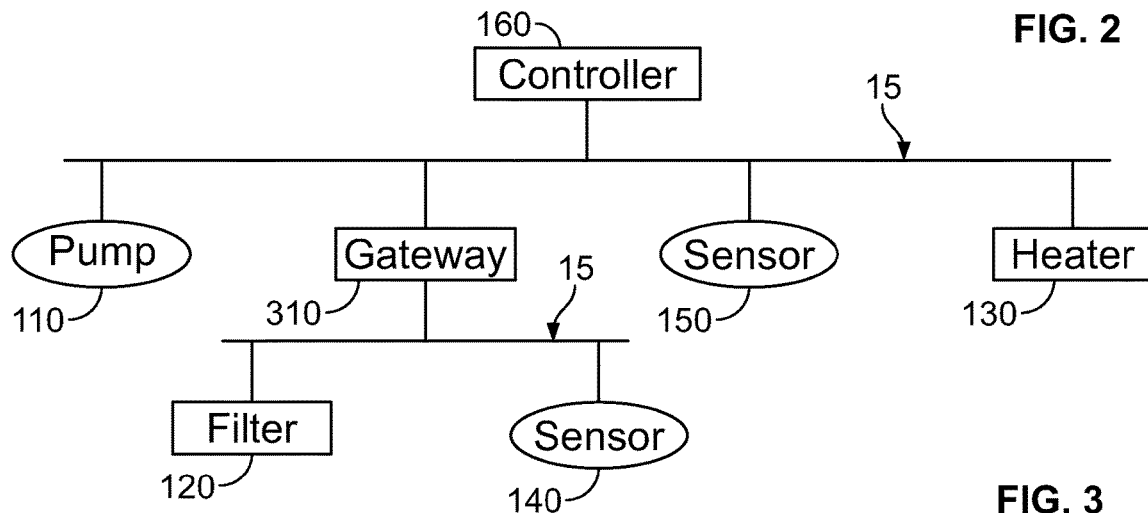
FIG. 3 is a diagram showing a gateway connecting network devices to a controller.

FIG. 3 is a diagram showing gateway 310 connecting networked devices 120, 140 to the controller 160. In this embodiment, the gateway 310 allows the network to be segmented. In one exemplary embodiment, the gateway 310 is itself a smart component with the added responsibility of distributing data/information as messages (e.g., in the form of packets) to/from the local RS-485 bus 15. Further, each gateway 310 can be responsible for initiating the discovery process on its local bus. Gateway 310 creates a table of unique addresses (e.g., device identifiers) that are sent to controller 160 for network address assignment.

Figure 4:
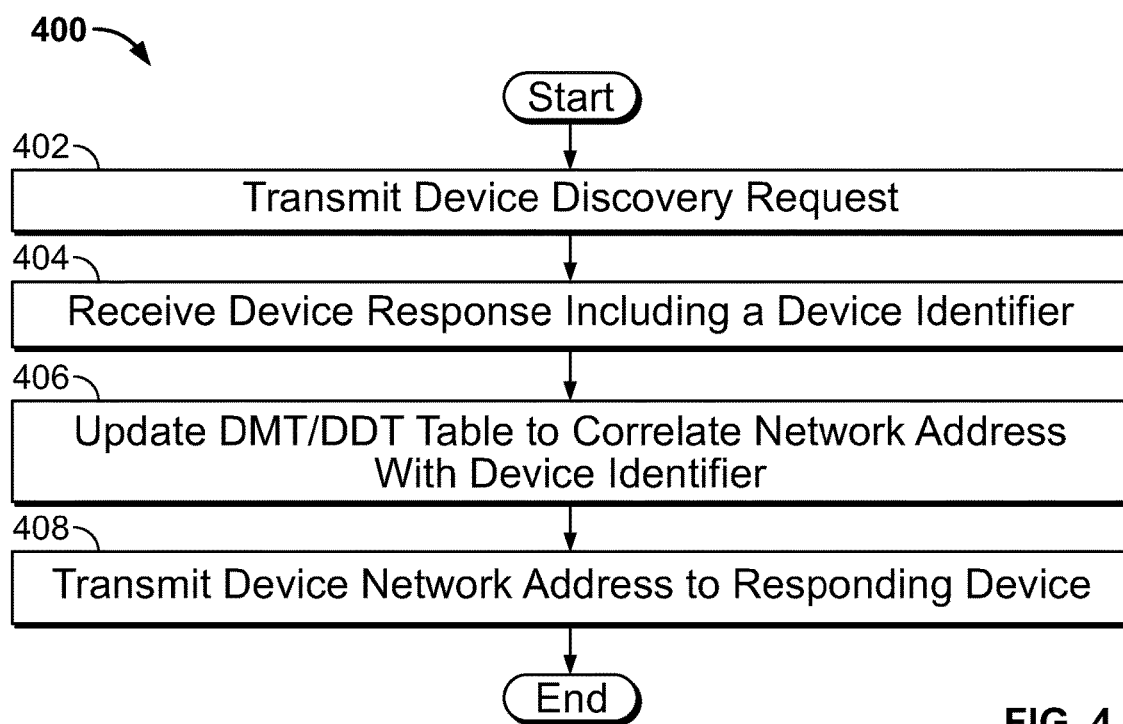
FIG. 4 is a flowchart showing overall processing steps performed by the system for dynamic device discovery and address assignment.

FIG. 4 is a flowchart illustrating processing steps carried out by the system (e.g., the controller 160 and/or gateway 310) for dynamic device discovery and address assignment over a network. The system allows a controlling device (e.g., a master pool/spa controller) to discover all subordinate/slave devices (e.g., pumps, lights, filters, heaters, sanitization equipment, gateways, etc.) present on a network (e.g. a half-duplex RS-485 serial bus). This protocol provides the master with the ability to find all devices at initial power up, as well as find any devices that are added to the network at points in time after the initial discovery has completed. To facilitate device discovery, controller 160 transmits or broadcasts a message in the form of a device discovery request on the network at step 402. Every un-configured slave network device 110-150 (e.g., a device without an assigned network address) responds to the device discovery request. The responses transmitted by the un-configured devices 110-150 are messages that can include device identifiers. At step 404, controller 160 receives a device response including a device identifier from each of the un-configured devices 110-150. The controller can maintain one or more tables to store network address information and device identifier information in non-transitory computer-readable media (e.g., device memory). At step 406, controller 160 updates two tables, including a device mapping table (DMT) and a device descriptor table, in device memory to correlate a network address (described below) with the device identifier for each un-configured device 110-150 from which the controller receives a response. Then, in step 408, controller 160 transmits the device network address assignment in a message to each of the responding devices (e.g., based on the correlation performed in step 406). This transforms the particular un-configured devices that responded to the device discovery request to configured devices. After a device is configured with a network address, the device will thereafter no longer respond to a device discovery request issued by the controller. This configuration/enrollment process continues until all un-configured devices 110-150 that respond to the device discovery request receive a network address. Controller 160 can maintain the device mapping table that maps device identifiers to network addresses in non-volatile RAM (NVRAM). Storing the device mapping in NVRAM allows faster startup times as the mapping only needs verification as opposed to initial creation. In one embodiment, slave devices 110-150 do not save the network address in NVRAM to allow for reconfigured and reassigned network addresses on every power up, system reset, or local device reset.

The dynamic discovery process 400 allows slave smart components (SC), e.g. devices 110-150, to be assigned a Network Address (NA) within a network (e.g., a pool/spa network). Discovery requests are addressed to the broadcast address, e.g. 0xFF, and responses are directed to the bus master address, e.g. 0x00. Each SC leaves the factory with a Unique Address (UA), e.g. device identifier, which is analogous to a MAC address, but is not reflective of a network address to be assigned by a controller in a network. In an exemplary embodiment, each device 110-160 (master and slave) on the bus 15 has a pre-programmed Unique Address (UA). For example, the UA is the device's serial number which is built into the device through a manufacturing process. One of the fields of the UA is a product code that defines the product type, and the other fields uniquely identify that particular device (e.g., a string of characters that can be used to distinguish the particular device from other devices of the same product type).

Figures 5, 6:
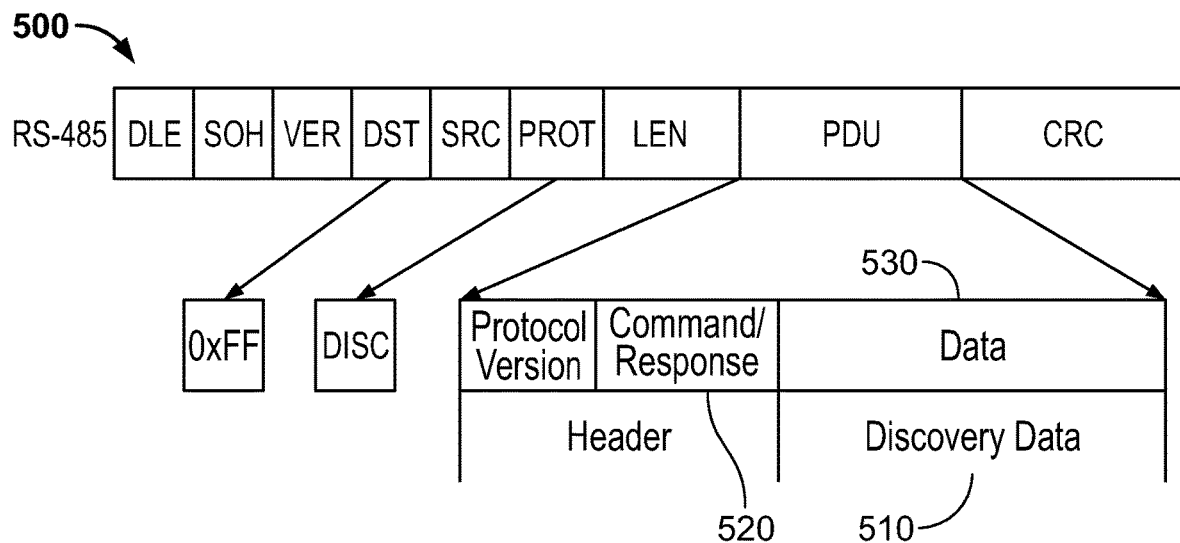
FIGS. 5-14 are diagrams showing various data structures in accordance with the present invention.

FIG. 5 shows an exemplary device packet 500 format. When a discovery request transmission is received by a device 110-150, if un-configured (i.e. no network address assigned) a packet 500 is sent from the device 110-150 back to controller 160 that includes the unique address in discovery data 510 in a data portion 530 of the packet 500. The Command/Response portion 520 of the packet 500 includes a header that provides further information as to what is included in the data portion 530 of the packet 500.

FIG. 6 shows an exemplary discovery command table 600. Depending on a value associated with the Command/Response portion 520 of the packet 500, the packet 500 is defined based on from where it is being transmitted (i.e., from controller 160 for a request, or from a responding slave device 110-150). FIGS. 7-12 illustrate exemplary packets that can be transmitted in accordance with embodiments of the present disclosure that can include the commands shown in the table 600.

Figure 7:
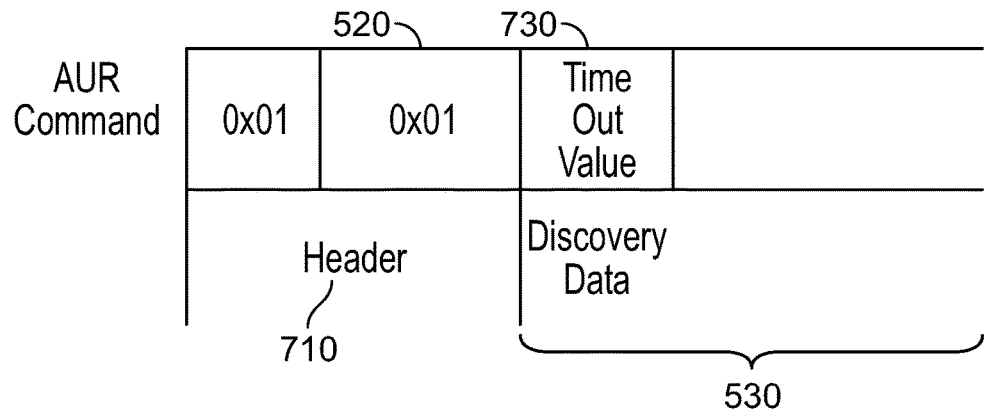
Figure 8:
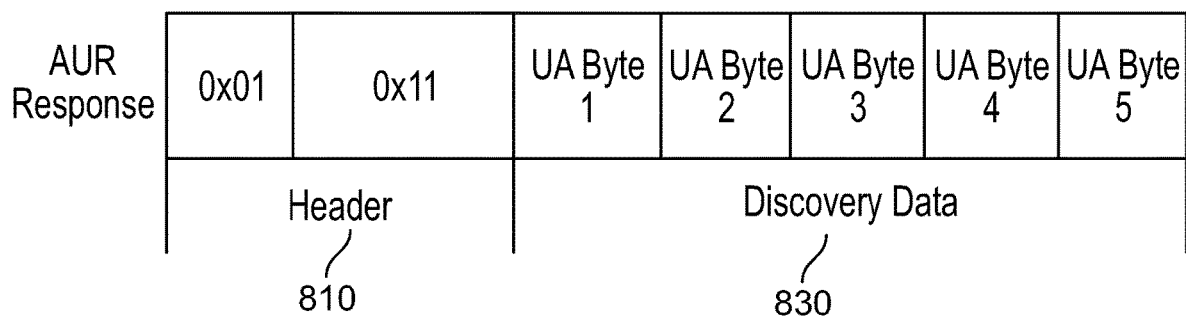

Referring now to FIG. 7, when the discovery request packet is sent from the controller 160, the packet can include a command ("AUR Cmd") in the Command/Response portion 520 of a header 710 defined by, e.g., a value of 0x01, which corresponds to a time out command transmitted by the controller 160. A time out value 730 is used to adjust the length of time that controller 160 will wait for responses before timing out. This byte is a value in tens of milliseconds, e.g., 1-10 ms. When a slave device 110-150 responds, the packet format would be as shown in FIG. 8 with header 810 (e.g., including a command value 0x011 corresponding to a response from a slave device) and discovery data 830 (e.g., including a UA of the device). UA bytes 1-5 in the discovery data 830 would then be used by the controller 160 to define the network address of the responding slave device 110-150. Once controller 160 has sent a discovery response request, it will not respond during the time out period. It will only receive the discovery responses from devices 110-150 and store them in a list until timeout is reached. After the timeout period expires the controller 160 then proceeds to assign a network address to each of the un-configured devices discovered.

Figure 9:
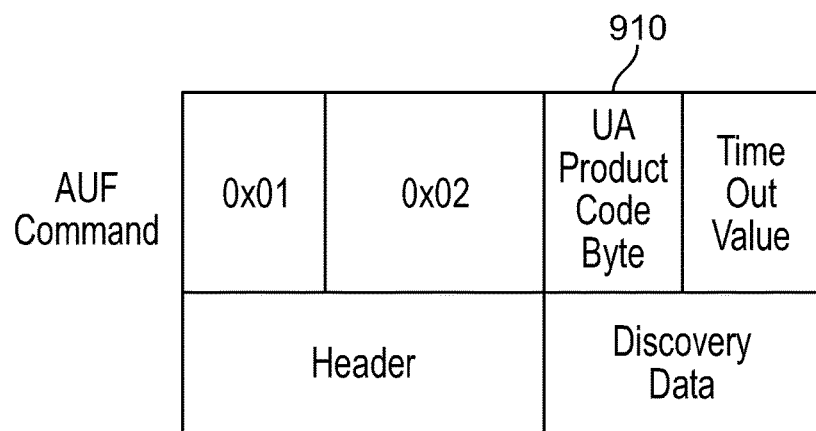
Figure 10:
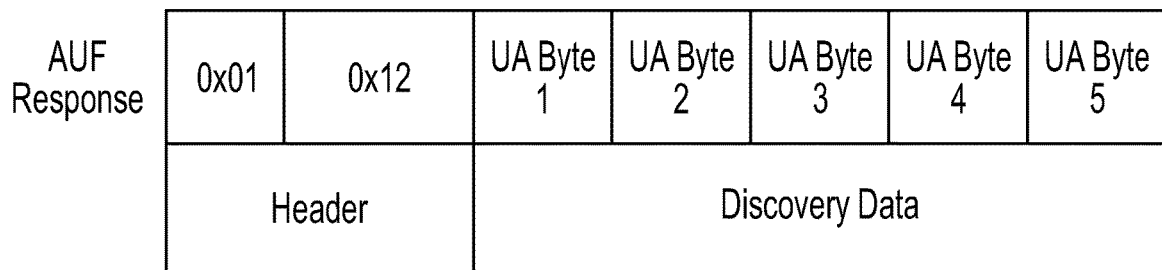

Alternatively, controller 160 can send a family-specific device discovery request using a command value of, e.g., 0x02, in the header of the packet, (e.g. temperature sensors only, heater only, pool lighting only, etc.) and by setting the UA product code byte 910 accordingly, as shown in FIG. 9. The UA product code byte 910 describes the type of the device, e.g., temperature sensor, heater, pool/spa light, etc. All connected devices 110-150 compare this code to their own product code within the UA and respond to the controller 160 if there is a match. A packet transmitted by a device in response to a family-specific device discovery request is shown in FIG. 10. If gateway 310 is installed, the gateway 310 will send its own local device discovery request to determine whether devices 120, 140 are connected to its local ports. Further, gateway 310 will be the last device to be discovered with a directed discovery (family-specific) to allow time for gateway 310 to discover all devices that are connected locally on the downstream bus 15. Each time gateway 310 is polled by controller 160, a UA of one un-configured device will be returned. Controller 160 will continue to poll each gateway 310 installed in the network until no response is returned, signifying completion of device discovery by the gateway 310.

Figure 11:
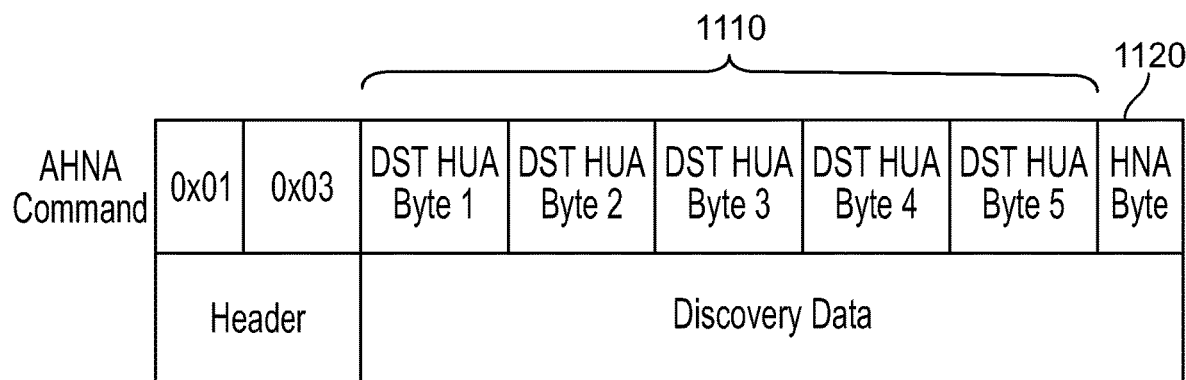
Figure 12:
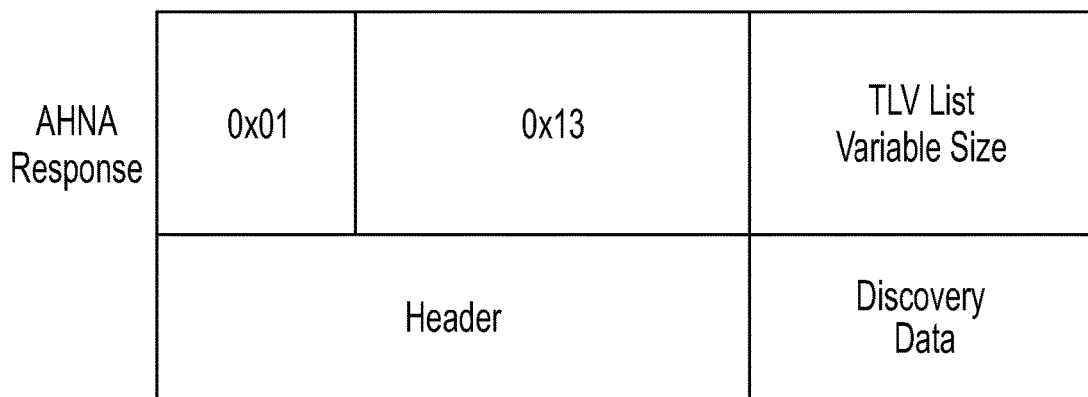

Referring now to FIG. 11, once controller 160 receives a response from a device 110-150, the command assigning a network address to the responding device 110-150 is sent (e.g., given by a value of 0x03 in the header). DST UA Bytes 1-5 (1110) address the assignment command to the desired device, and the NA byte 1120 is assigned to the desired device via the packet shown in FIG. 11. Additionally, FIG. 12 shows a response (AHNA), which returns (describes) the capabilities of the newly discovered device.

Figure 13:
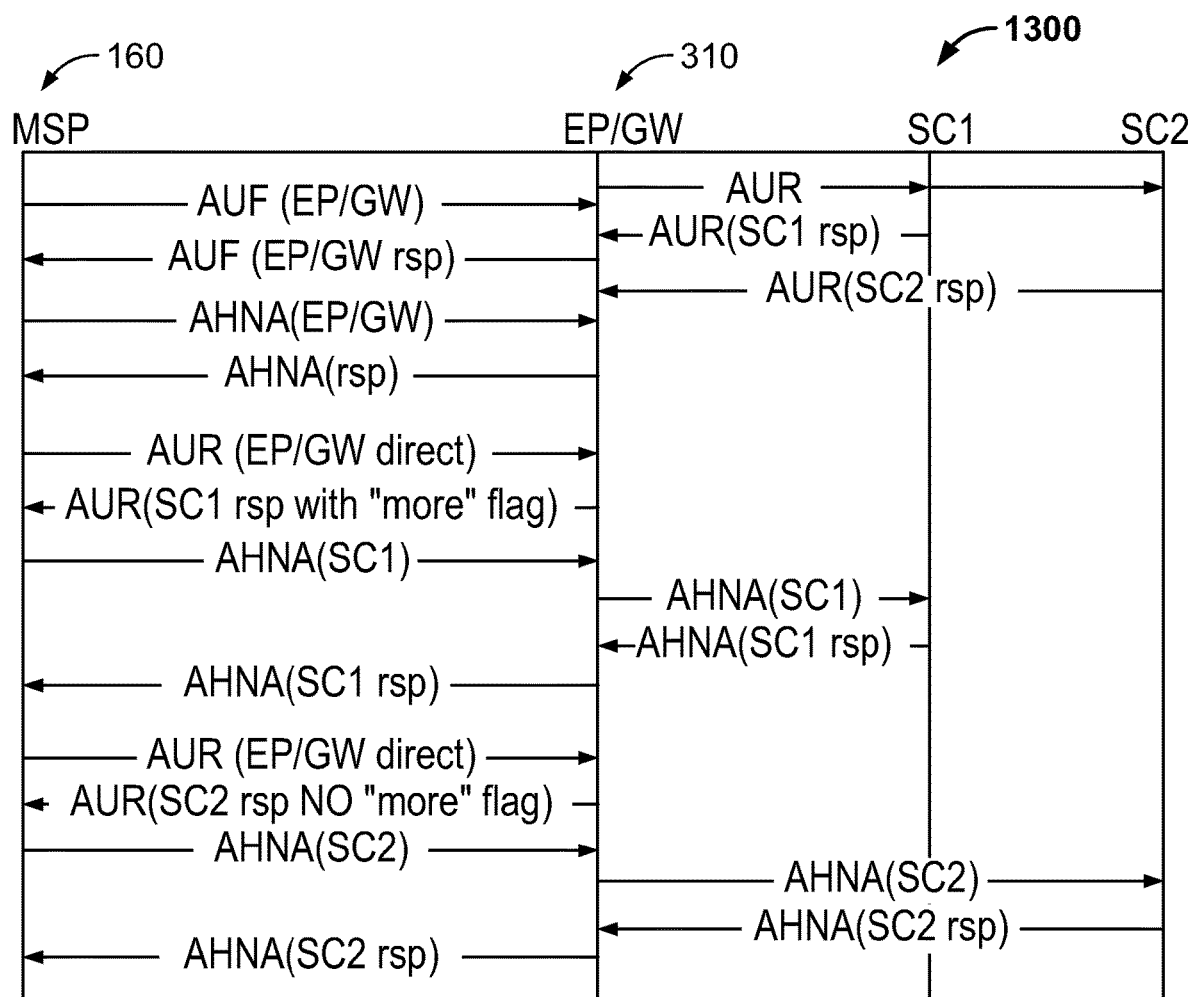

FIG. 13 shows a discovery communication process 1300 conducted in accordance with the present invention between controller 160 (MSP), a gateway 130, and two or more slave devices (indicated as SC1 and SC2 in FIG. 13). Network addresses are assigned to devices connected to the gateway 310 last to allow each gateway 310 more time to gather locally-discovered devices. When a gateway 310 responds to a directed AUR/AUF request, it responds with the first device in its list. This response also contains a flag "more to send" to indicate to controller 160 that there are more devices to assign network addresses. Controller 160 continues to send directed requests to gateway 310 until the "more to send" flag is disabled.

Figure 14:
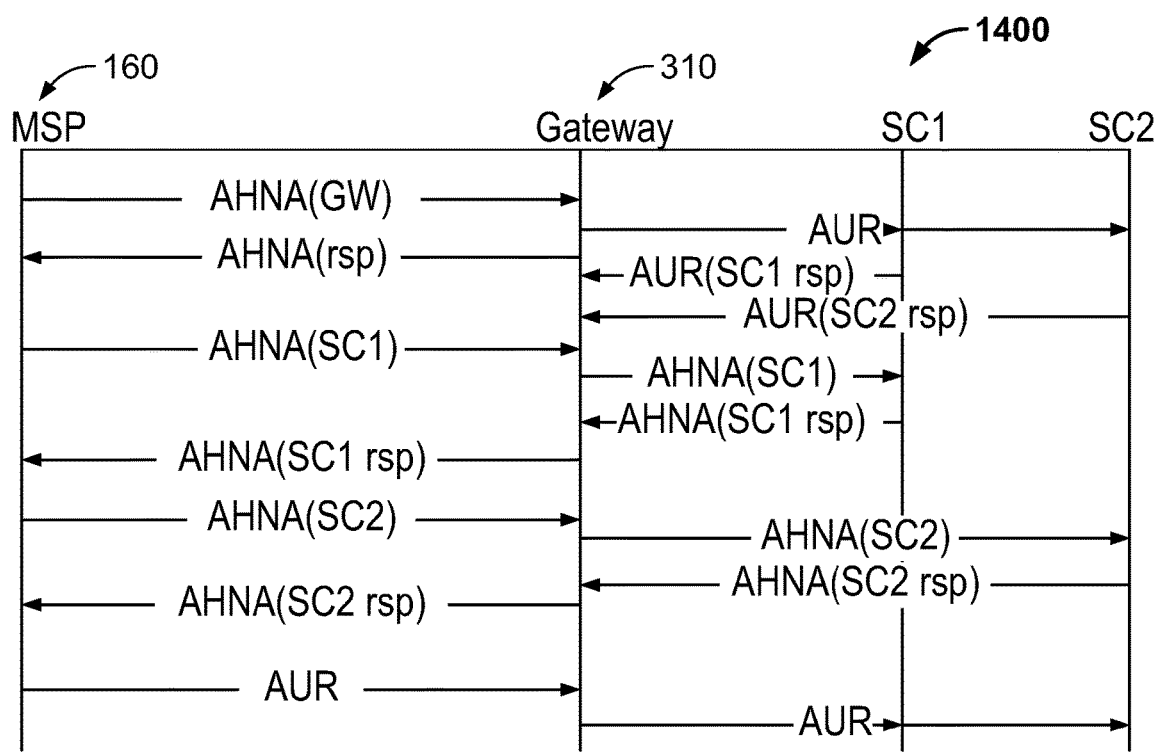

FIG. 14 shows a dataflow 1400 of a startup of an existing network system (i.e., after power interruption). Controller 160 ("MSP") already contains a saved structure of mapping in non-volatile memory, and it steps through the saved mapped network to poll existing network devices and listens for responses from each connected device. The first devices configured are gateways 310 to allow time for gateway polling of connected devices (e.g., "SC1" and "SC2"). If a previously connected device is not heard from, a directed command can be sent. A mapping table maintained by the master device is updated with any non-responsive devices as not connected to the network and a device discovery request is then sent to find any newly connected devices to the network.

When a system is powered-up which utilizes the dynamic discovery protocol described herein, the controlling master device (e.g., controller 160) sends a discovery request packet to the broadcast address. All operational devices on the bus will receive this packet. Every unconfigured slave device (e.g., no assigned NA) will respond to the discovery request with its UA. In one embodiment, each slave uses a random backoff timer to reduce the number of collisions during the discovery period. As the master device receives a response, it assigns and transmits a NA configuration command to the UA of the responding (unconfigured) slave device. Only the slave device with the matching UA will accept the NA assignment. This slave is now considered configured and will no longer respond to discovery requests. As more slave devices enter the configured state, the number of collisions subsides. The discovery process continues until no more devices respond. At this time the network has settled and normal operation of the network will continue. In an exemplary embodiment, the master device is programmed to send a device discovery request upon startup, and at regular or periodic intervals as desired. In exemplary embodiments, the gateway cannot push newly discovered devices back to the master device without a discovery request from the master device.

Figure 15:
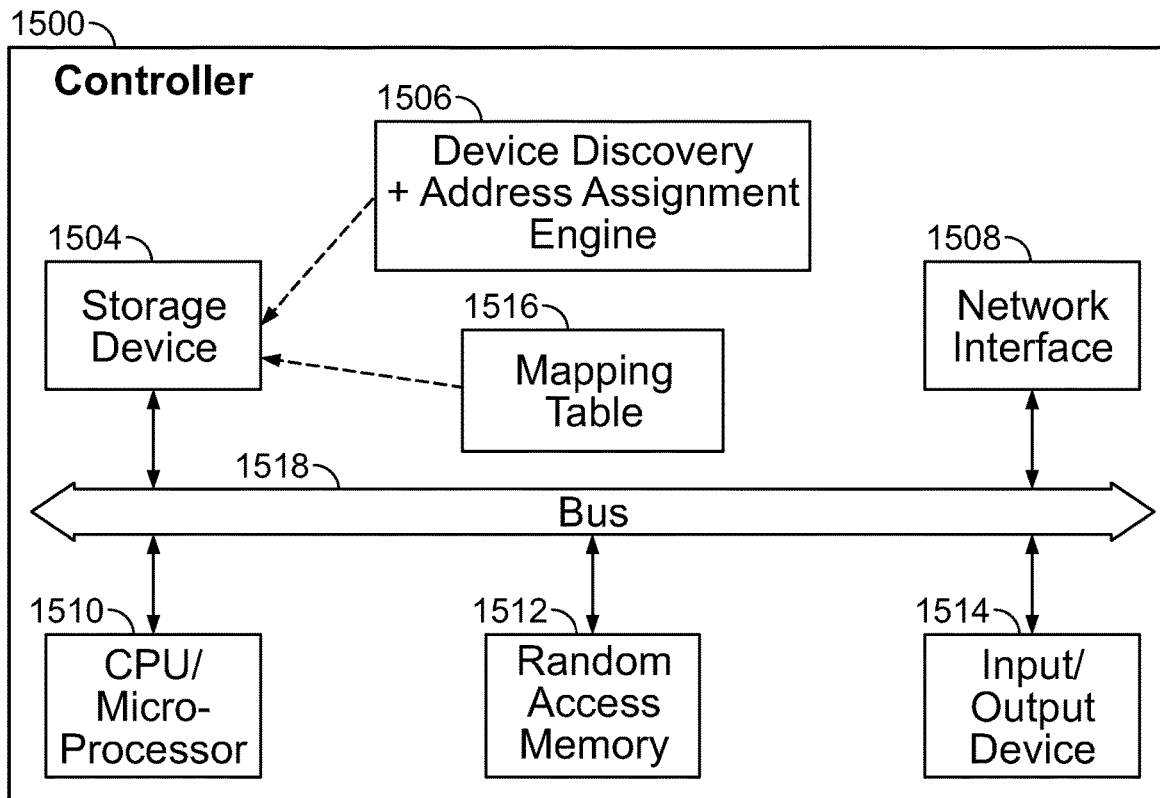
FIG. 15 is a diagram showing hardware and software components of a device capable of performing the processes of the present invention.

FIG. 15 is a diagram showing hardware and software components of a controller system 1500 capable of performing the processes discussed above. The system 1500 includes a processing server, e.g., a computer, and the like, which can include a storage device 1504, a network interface 1508, a communications bus 1518, a central processing unit (CPU) 1510, e.g., a microprocessor, and the like, a random access memory (RAM) 1512, and one or more input devices 1514, e.g., a keyboard, a mouse, and the like. The processing server can also include a display, e.g., a liquid crystal display (LCD), a cathode ray tube (CRT), and the like. The storage device 1504 can include any suitable, non-transitory computer-readable storage medium, e.g., a disk, non-volatile memory, read-only memory (ROM), erasable programmable ROM (EPROM), electrically-erasable programmable ROM (EEPROM), flash memory, field-programmable gate array (FPGA), and the like. The processing server can be, e.g., a networked computer system, a personal computer, a smart phone, a tablet, and the like.

The present invention can be embodied as a dynamic device discovery and address assignment software module and/or engine 1506, which can be embodied as computer-readable program code stored on the storage device 1504 and executed by the CPU 1510 using any suitable, high or low level computing language, such as, e.g., Java, C, C++, C #, .NET, and the like. The network interface 1508 can include, e.g., an Ethernet network interface device, a wireless network interface device, any other suitable device which permits the processing server to communicate via the network, and the like. The CPU 1510 can include any suitable single- or multiple-core microprocessor of any suitable architecture that is capable of implementing and/or running the dynamic device discovery and address assignment software 1506, e.g., an Intel processor, and the like. The random access memory 1512 can include any suitable, high-speed, random access memory typical of most modern computers, such as, e.g., dynamic RAM (DRAM), and the like. A mapping table 1516 can be stored in the storage device 1504.

Having thus described the invention in detail, it is to be understood that the foregoing description is not intended to limit the spirit or scope thereof. It will be understood that the embodiments of the present invention described herein are merely exemplary and that a person skilled in the art may make any variations and modification without departing from the spirit and scope of the invention. All such variations and modifications, including those discussed above, are intended to be included within the scope of the invention. What is desired to be protected by Letters Patent is set forth in the following appended claims.

The invention claimed is:

1. A pool or spa system supporting dynamic device discovery, the system comprising:
   a controller for communication with a pool or spa device, the pool or spa device operable to perform one or more operations with respect to a pool or spa, the controller including: 1) a communication interface configured for communication with the pool or spa device via a network; and 2) a processor configured to:
   receive a discovery request response corresponding to the pool or spa device and including a first unique device identifier, the first unique device identifier including a plurality of data fields within the discovery request response, said plurality of data fields comprising a first data field identifying a device type of the pool or spa device and a second data field distinguishing the pool or spa device from one or more other pool or spa devices of the same device type; and
   transmit a configuration command packet to the pool or spa device over the network, the configuration command packet including a second unique device identifier and an available network address, the configuration command packet for configuring the pool or spa device for communication using the available network address based on a determination that the second unique device identifier matches the first unique device identifier thereby enabling addressed communication between the pool or spa device and the controller.

2. The system of claim 1, wherein the discovery request response describes at least one capability of the pool or spa device.

3. The system of claim 1, wherein the discovery request response comprises a header corresponding to a discovery request response and a data portion including the first unique device identifier associated with the pool or spa device.

4. The system of claim 1, wherein the pool or spa device does not retain the available network address when the pool or spa slave device is powered down.

5. The system of claim 1, wherein the communication interface of the controller communicates with the pool or spa device by way of a gateway device operatively coupled therebetween to facilitate assignment of the available network address to the pool or spa device.

6. The system of claim 1, wherein the controller is operatively coupled to one or more additional pool or spa devices by way of the network, the additional pool or spa devices including at least one of a pump, a filter, a sensor, or a heater.

7. The system of claim 1, wherein the pool or spa device is a pump.

8. The system of claim 1, further comprising said pool or spa device.

9. The system of claim 1, wherein the controller is configured for bidirectional communication with the pool or spa device.

10. The system of claim 1, wherein the pool or spa device is configured for communication with the controller over an RS-485 serial connection.

11. The system of claim 1, wherein the pool or spa device is configured for wireless communication with the controller.

12. The system of claim 1, comprising a random backoff timer to reduce packet collisions during a discovery period.

13. A method of dynamically discovering a pool or spa device in a pool or spa system, comprising the steps of:
   receiving, at a controller, a discovery request response corresponding to the pool or spa device and including a first unique device identifier, the first unique device identifier including a plurality of data fields within the discovery request response, said plurality of data fields comprising a first data field identifying a device type of the pool or spa device and a second data field distinguishing the pool or spa device from one or more other pool or spa devices of the same device type; and transmitting, by the controller, a configuration command packet to the pool or spa device over a network, the configuration command packet including a second unique device identifier and an available network address, the configuration command packet for configuring the pool or spa device for communication using the available network address based on a determination that the second unique device identifier matches the first unique device identifier thereby enabling addressed communication between the pool or spa device and the controller.

14. The method of claim 13, wherein the discovery request response describes at least one capability of the pool or spa device.

15. The method of claim 13, wherein the discovery request response comprises a header corresponding to a discovery request response and a data portion including the first unique device identifier associated with the pool or spa device.

16. The method of claim 13, comprising the steps of:
correlating the first unique device identifier received at the controller with the available network address; and
assigning the available network address to the pool or spa device by controller based on said correlation.

17. The method of claim 13, comprising the step of periodically determining by the controller whether another pool or spa device in communication therewith requires configuration.

18. The method of claim 13, comprising the step of maintaining at least one table correlating the first unique device identifier associated with the pool or spa device with the available network address.

19. The method of claim 13, comprising the step of establishing a connection with a gateway device operatively coupled between a communication interface of the controller and the pool or spa device, the gateway device communicating with the pool or spa device on behalf of the controller to facilitate assignment of the available network address to the pool or spa device.

20. The method of claim 13, comprising the step of establishing communication between the controller and one or more additional pool or spa devices, the additional pool or spa devices including at least one of a pump, a filter, a sensor, or a heater.

21. The method of claim 13, wherein the pool or spa device is a pump.

22. The method of claim 13, wherein the controller is configured for bidirectional communication with the pool or spa device.

23. The method of claim 13, wherein the pool or spa device is configured for communication with the controller over an RS-485 serial connection.

24. The method of claim 13, wherein the pool or spa device is configured for wireless communication with the controller.

25. The method of claim 13, comprising using a random backoff timer to reduce packet collisions during a discovery period.

* * * * *